(12) United States Patent
Metzler

(10) Patent No.: US 9,109,890 B2
(45) Date of Patent: Aug. 18, 2015

(54) SURVEYING METHOD

(75) Inventor: Bernhard Metzler, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 325 days.

(21) Appl. No.: 13/639,772

(22) PCT Filed: May 10, 2011

(86) PCT No.: PCT/EP2011/057473
§ 371 (c)(1),
(2), (4) Date: Oct. 5, 2012

(87) PCT Pub. No.: WO2011/141447
PCT Pub. Date: Nov. 17, 2011

(65) Prior Publication Data
US 2013/0050474 A1    Feb. 28, 2013

(30) Foreign Application Priority Data

May 10, 2010   (EP) ..................... 10162447

(51) Int. Cl.
*H04N 7/18* (2006.01)
*G01C 15/00* (2006.01)
(Continued)

(52) U.S. Cl.
CPC ............... *G01C 15/002* (2013.01); *G01C 1/04* (2013.01); *G06K 9/00214* (2013.01)

(58) Field of Classification Search
CPC ........ G01C 1/04; G01C 15/002; G01C 15/00; G06K 9/00214; G01B 11/022; G01B 11/024; G01B 11/00; G01B 21/00; H04N 7/18; H04N 7/181; G06T 7/004; G08B 13/00

USPC .......................................................... 348/135
See application file for complete search history.

(56) References Cited

U.S. PATENT DOCUMENTS 4,290,207 A  *  9/1981  Browning et al. ............... 33/295
5,502,898 A  *  4/1996  Manore ........................... 33/1 V
(Continued)

FOREIGN PATENT DOCUMENTS

| CN | 1688867 B | 9/2012 |
|----|-----------|--------|
| EP | 1460377   | 9/2004 |
| EP | 1574821   | 9/2005 |

OTHER PUBLICATIONS

Haala et al, An updated on automatic 3D building reconstruction, Jan. 2010.*

(Continued)

*Primary Examiner* — Shan Elahi
(74) *Attorney, Agent, or Firm* — Maschoff Brennan

(57) ABSTRACT

A surveying method wherein an object belongs to a group of known types of objects, and determining an object representing point corresponding to the type of the object, including determining a series of points at an object by measuring distances and angles to the points in a defined angle area, analyzing the spatial distribution of the points and, based thereon, assigning relevant points to a first group of points, identifying the type of the object on the basis of the first group of points, capturing an image of the object, extracting a contour of the object from the image by use of an image processing method, fitting at least one space curve to the object on the basis of the first group of points and the extracted contour, and determining the coordinates of the object representing point from the fitted space curve.

18 Claims, 5 Drawing Sheets

(51) Int. Cl.
*G01C 1/04* (2006.01)
*G06K 9/00* (2006.01)

(56) References Cited

U.S. PATENT DOCUMENTS

| | | | |
|---|---|---|---|
| 5,517,419 A * | 5/1996 | Lanckton et al. | 701/409 |
| 5,988,862 A * | 11/1999 | Kacyra et al. | 703/6 |
| 6,420,698 B1 * | 7/2002 | Dimsdale | 250/234 |
| 6,633,290 B1 | 10/2003 | Kung et al. | |
| 7,075,634 B2 * | 7/2006 | Uezono et al. | 356/139.1 |
| 7,098,997 B2 * | 8/2006 | Shirai et al. | 356/3.01 |
| 7,184,036 B2 * | 2/2007 | Dimsdale et al. | 345/419 |
| 7,218,384 B2 * | 5/2007 | Shirai et al. | 356/3.01 |
| 7,342,650 B2 | 3/2008 | Kern et al. | |
| 7,633,610 B2 * | 12/2009 | Walser | 356/141.5 |
| 7,830,501 B2 * | 11/2010 | Kludas et al. | 356/139.1 |
| 8,396,681 B2 * | 3/2013 | Svanholm et al. | 702/94 |
| 2003/0160757 A1 * | 8/2003 | Shirai et al. | 345/156 |
| 2003/0179361 A1 * | 9/2003 | Ohtomo et al. | 356/4.01 |
| 2004/0004706 A1 * | 1/2004 | Uezono et al. | 356/3 |
| 2004/0109012 A1 * | 6/2004 | Kraus et al. | 345/700 |
| 2005/0102097 A1 * | 5/2005 | Tanizaki et al. | 701/208 |
| 2005/0195384 A1 * | 9/2005 | Ohtomo et al. | 356/4.05 |
| 2005/0207621 A1 * | 9/2005 | Murai et al. | 382/106 |
| 2005/0228614 A1 * | 10/2005 | Usbeck et al. | 702/179 |
| 2007/0293985 A1 * | 12/2007 | Myeong et al. | 700/245 |
| 2008/0018880 A1 | 1/2008 | Matsuo et al. | |
| 2009/0024325 A1 * | 1/2009 | Scherzinger | 702/5 |
| 2009/0086020 A1 * | 4/2009 | Westrick et al. | 348/140 |
| 2009/0138233 A1 * | 5/2009 | Kludas et al. | 702/158 |
| 2009/0220144 A1 * | 9/2009 | Mein et al. | 382/154 |
| 2009/0231574 A1 * | 9/2009 | Vogel et al. | 356/154 |
| 2009/0262974 A1 * | 10/2009 | Lithopoulos | 382/100 |
| 2010/0172546 A1 * | 7/2010 | Sharp | 382/106 |
| 2010/0303300 A1 * | 12/2010 | Svanholm | 382/106 |
| 2011/0038226 A1 * | 2/2011 | Scott | 367/21 |
| 2012/0249783 A1 * | 10/2012 | Nindl et al. | 348/135 |
| 2014/0210856 A1 * | 7/2014 | Finn et al. | 345/633 |

OTHER PUBLICATIONS

Ma et al, Survey of Data Association of Moving Objects tracking in video sensors network, 2009.*
European Search Report completed Oct. 22, 2010 in European Patent Application No. 10162447.

* cited by examiner

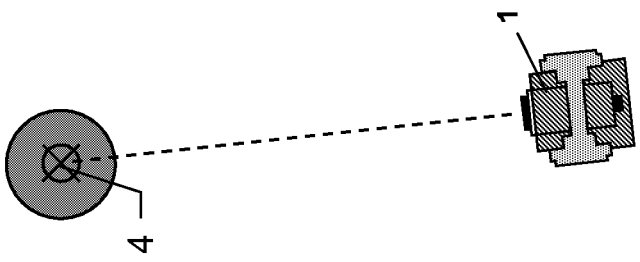
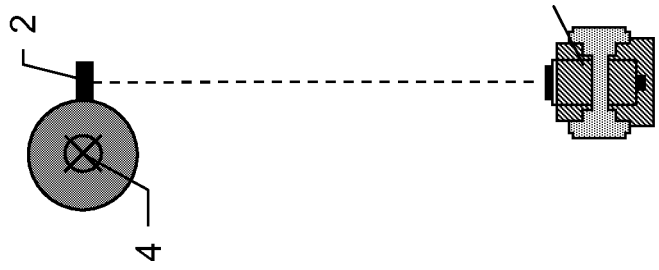
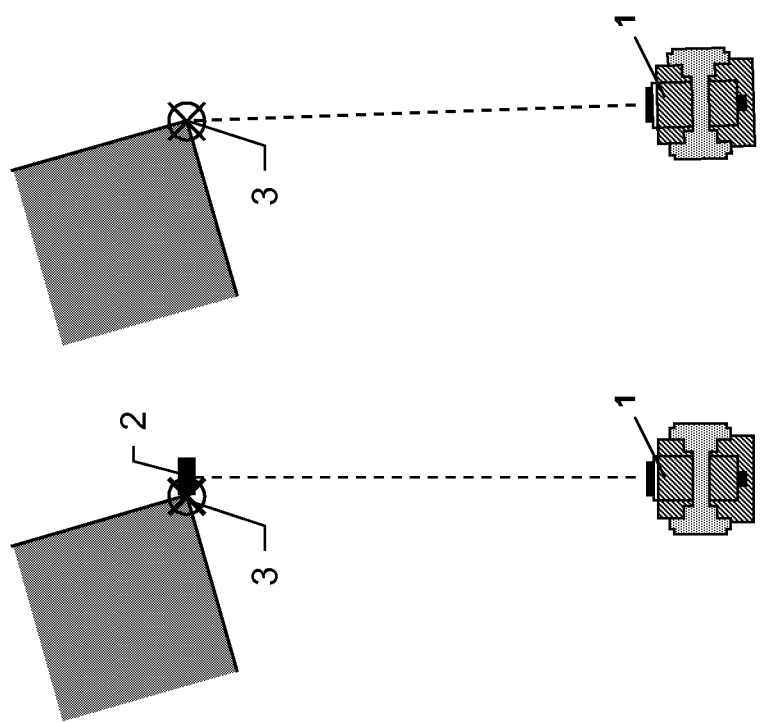

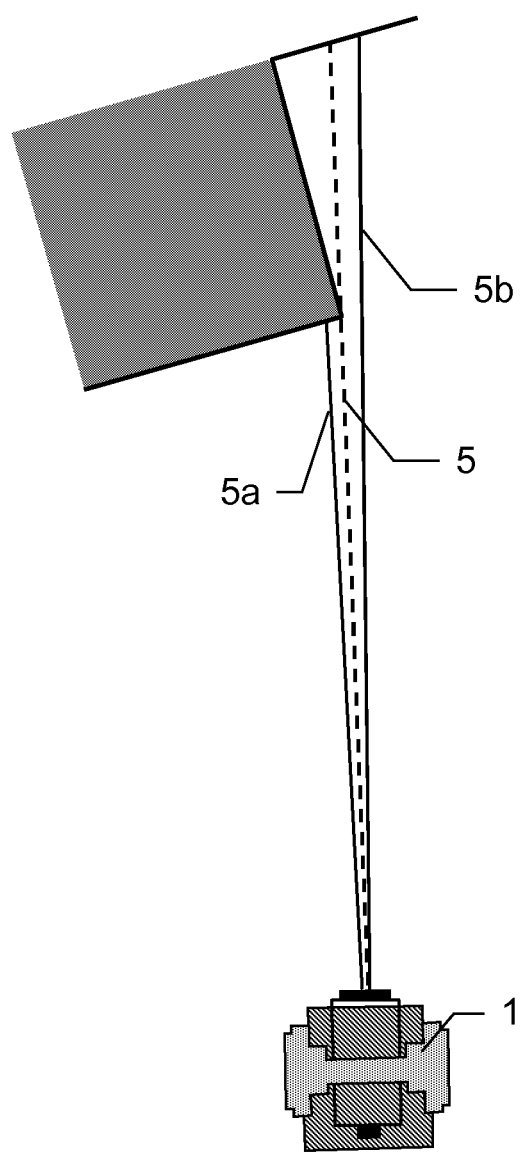

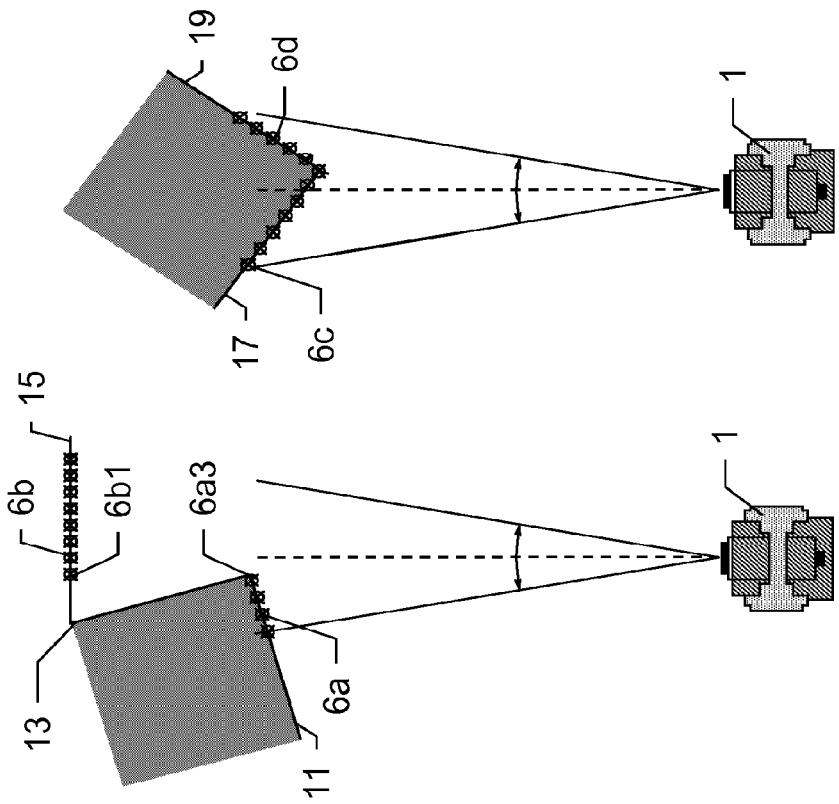

SURVEYING METHOD

FIELD OF THE INVENTION

The invention relates to a surveying method especially capable to determine object representing points which represent surveying objects and corresponding base points. Such an object representing point can be for instance a corner point of a building or a center point of a mast or a tree.

BACKGROUND

In surveying of object representing points in general a perpendicular pole, also known as range pole or surveying pole, is employed. A perpendicular pole is a pole used for surveying and having a reflector on its top end. The reflector serves for reflecting beams such as laser beams or light beams emitted from a surveying instrument or another source, back to the surveying instrument. The perpendicular pole is placed vertically right on the point to be surveyed, and then a horizontal angle, a vertical angle as well as the distance from the used surveying instrument such as a total station to a reflector mounted on top of the perpendicular pole is measured. The base point is then derived by subtracting the vertical height from the measured coordinates.

This method, however, can be employed only, if the perpendicular pole can be placed directly and vertically on the point. Therefore, this method cannot be directly employed if for instance the object representing point is the basis point of a building corner, the central point of a pole, mast, tree etc.

In such cases, in a first step the perpendicular pole is to be placed adjacent to the object to be surveyed. FIGS. 1a and 1b show an example for measuring a corner of a house. Here, the distance from a total station 1 used as surveying instrument to a reflector on top of the perpendicular pole 2 more or less corresponds to the distance of the corner 3 of the house to be surveyed. In a second step the total station 1 is collimated with the corner of the house and the horizontal angle as well as the vertical angle is measured. On the basis of the angle and distance measurements the coordinates of the object representing point are computed.

Another example where a mast is surveyed is shown in FIGS. 1c and 1d. Here, for the determination of the distance the perpendicular pole 2 is also placed adjacent to the mast. The measured distance from the total station to the reflector on top of the perpendicular pole 2 more or less corresponds to the distance from the used total station to the centre point 4 of the mast. For the angle measurement the total station 1 is collimated with the centre of the mast. On the basis of the angle and distance measurements the coordinates of the object representing point are computed.

As can be gathered from the FIGS. 1a to 1d as well as from the above explanation, problems with this surveying method may occur. Firstly, a plurality of manual steps is to be performed in order to obtain a surveying result. This has negative effects on the productivity. Secondly, due to inaccuracies when placing the perpendicular pole 2 and the reflector, respectively, the accuracy of the obtained surveying results is limited. Therefore, the reliability of the obtained surveying results cannot be fully ensured.

A possible solution would be to perform a reflector-less measurement directly to the edge of the object. The edge of the object is to be understood as the edge of a house wall corner. However, as can be seen from FIG. 2a, this method is neither fully reliable. As shown in FIG. 2a, a portion 5b of the measuring beam 5 (e.g. a laser beam) might pass the respective edge while another portion 5a is reflected from the wall forming the edge. This leads to a confusing result of the distance measurement and the exact object representing point data cannot be obtained either.

Document EP 1 460 377 A2 discloses a method for surveying an object. Here, a surveying instrument is directed to an object to be surveyed and an image is captured by an integrated camera. From a plurality of templates, a user may select the one corresponding to the surveyed object. Via image processing methods the template is identified in the captured image and based on the result, the object representing point is identified. Furthermore, a distance between the surveying instrument and the object to be surveyed is determined.

With the method disclosed in EP 1 460 377 A2, a plurality of operating steps is to be carried out by the user. Thus, in order to increase productivity, there is need for an optimized surveying method capable to determine the shape and type of a surveyed object in an automated manner.

SUMMARY

The invention relates to a surveying method for use with a surveying instrument, e.g. a preferably motorized total station, wherein the surveying instrument is provided with imaging means, distance measurement means and angle measurement means for detecting a photographing direction of the imaging means, in particular of a camera. First, a step of determining a series of points at an object, wherein the series may comprise between five and 100 points, by measuring distances and angles to the points in an angle area, wherein the angle area may lay between, e.g., 1° and 20° and usually is about 4° (i.e., an angle area of ±2° relatively to a manual positioning), under use of the surveying instrument is executed. Further, the angle area may be variable in said range. The angle area also may depend on the distance to the object and on the size of the object. Next, the spatial distribution of the points, particularly given by the distances from the surveying instrument to the successive points, is analyzed and the points are divided into a group of relevant points and a group of not relevant points, wherein the relevant points usually lay on the object and the not relevant points lay on background objects. After that, the type of the object on the basis of the relevant points is determined. In that step, it is distinguished whether the object is of circular or plane shape or corresponds to any other known object type. Additionally, an image of the object is captured with a camera, wherein the photographing direction is known and a relation between the image and the angles to the measured points is established. From this image edges corresponding to contours of the object are extracted by use of an image processing method, in particular by edge detection. Afterwards, a space curve is fitted to the object on the basis of the first group of points and the extracted contour. And finally, the coordinates of an object representing point, also called point of interest, are determined from the fitted space curve. As the object representing point is defined for each relevant object type, the coordinates can be derived from the information of the space curve in the measurement room.

The space curve is to be understood as a curve representing an object and being derived from the spatial positions of an amount of points (at least one point) and additional object related information, e.g. extracted contours of the object. This space curve may be determined on basis of information generated by fitting a line to measured points, by defining a plane by means of an extracted contour of the object and by an intersection of the fitted line with the plane.

Particularly, the surveying method may be executed in an automated manner after the surveying instrument was roughly aimed to the object.

Comparing to prior art methods, an advantage of the invention is the higher accuracy of defining edges, corners or contours of objects for geodetic measuring means. Moreover, one object representing point corresponding to the measured object can be determined and the coordinates of the point define the position of the object. Additionally, the whole surveying method preferably is executed in an automated manner and, thus, simplifies the procedures of defining and measuring points on objects for the operator of the surveying instrument.

The execution of the surveying method should be explained roughly by means of one example. A person wants to determine the coordinates of a corner point which represents one edge of a house with a surveying instrument. He roughly directs the surveying instrument onto the edge of the house and starts the automated surveying method, by pressing a button on the instrument or on a controller that is wirelessly connected to the instrument. After it, the surveying instrument turns 5° to the left side to a start position. From this position the instrument swivels 10° horizontally in the opposite direction and measures at the same time distances to a series of points with given point density of e.g. one to ten points each 1°. When the swivelling is finished a group of points laying roughly on a straight line and another group of points not corresponding to a geometric figure are recognized. Accordingly, a plane object is supposed and an image of the house and its edge is taken. Using an image processing method the edge of the house is extracted from the image and a line is fitted to the roughly ordered points. By combining the information about the position of the edge and the fitted line an object representing point (point of interest) is determined exactly laying on the edge of the house. The image and the coordinates of the object representing point are displayed on the surveying instrument and on the wirelessly connected controller.

The method according to the invention is especially suitable for single objects such as wall corners, masts or trees. In general the shape and type of an object, whether the object consists of plane shapes or rather has a cylindrical shape, can be determined from the relation of individual points that are measured at the object. For this purpose, furthermore, predefined rules or patterns can be stored in a memory of the surveying instrument.

For instance, if the series of measured points more or less corresponds to a straight line, it can be determined that the respective object is a wall, e.g. a building wall. Alternatively, if the series of measured points more or less correspond to a conic section, that is to a circle, an ellipse, a hyperbole or a parable, it can be determined that the object to be surveyed has a cylindrical or conical shape.

According to the invention, a fitted line (e.g. line, ellipse, etc.) may be calculated, which approximately corresponds to the series of points lying on the wall or the mast or the tree. Thus, the data of the measured points are transformed to an exact geometric fitted line such as a line or a conic section or a curve of higher order.

Furthermore, the series of points may be split into at least a first group of points which lay on the measured object and a second group of points in the background, if a measured distance between two neighboring points exceeds a predetermined distance.

Furthermore, the series of points may be split into a first group of points which lay on the measured object and a second group of points in the background, if a distance from a surveying instrument to a measured point and the distance from the surveying instrument to the neighbouring measured point differs significantly, i.e. the absolute of the distance difference exceeds the distance difference of the points measured before by a predetermined ratio. Further, there may be the second group of points an empty group, if all points are laying on the object and do not exceed the distance difference.

Furthermore, at least one fitted line, in particular a straight line or a conic section, is calculated, which approximately corresponds to the first group of points. The applied software algorithm has to determine how many fitted lines and which type of fitted lines are present in the first group of points, and—if more than one fitted line is present—which measured points belong to which fitted line. For the calculation of the fitted lines software algorithms such as "Ransac" or "Split-and-Merge" can be used. Both methods are well known to a skilled person.

"Ransac" (Random Sample Consensus) is an iterative method to estimate parameters of a mathematical model from a set of data which contains outliers. The mathematical model represents the fitted line, for instance a straight line, and the set of data corresponds to the first group of measured points. The algorithm separates the whole set of points into a set of "inliers", i.e. points whose distribution can be explained by the model parameters—in this case points whose deviation to a specific straight line is in the range of a few centimeters—and a set of "outliers" which are points that do not fit the model. If the number of "inliers" exceeds a predefined number of points, the model of the straight line is accepted. Otherwise, another model, for instance an ellipse is investigated. If a valid model is identified, for instance a straight line, and a significant number of "outliers" remains, also a model for these points is sought, for instance a second straight line or an ellipse.

In "Split-and-Merge" also a mathematical model, for instance a straight line, is estimated for all points of the first group. Then, the point with the maximum distance to the straight line is detected. If the maximum distance is less than a predefined threshold, for instance several centimeters, the model is accepted. Otherwise, the set of points is separated into two subsets at the point with the maximum distance. For each subset the procedure is repeated, until the maximum distance is less than the predefined threshold or the number of points in the subset is smaller than a predefined minimum.

According to the invention, the obtained curves can be used for a more accurate determination of an object representing point or base point. An object representing point (point of interest) in the sense of the invention is a point suitable for exactly defining an objects position of known object types. For a two-dimensional plan view such a point representing a wall corner can be an arbitrary point laying on the vertical corner edge. For a mast or a tree the representing point can be an arbitrary point on the vertical axis through the centre of the object. A base point in the sense of the invention is a specific object representing point laying on the ground surface, i.e. the intersection of the vertical corner edge or the vertical axis of a tree with the ground surface.

Advantageously, one plane can be defined by the edge extracted from the image and by the position of the surveying instrument, and an object representing point for an object can be determined as an intersection point between the at least one plane and a fitted line. Such a method is especially suitable for surveying plane surface objects such as individual walls, buildings, fences or hedges.

Alternatively, two planes can be defined by the position of the surveying instrument and the two edges extracted from the image, respectively, and an object representing point for an object can be determined as a centre of an ellipse approximately corresponding to the space curve and touching each of the two planes. Such a method is especially suitable for surveying cylindrical objects such as masts, poles, trees, advertising pillar, or round shaped buildings.

Furthermore, alternatively, an object representing point for an object can be determined as an intersection point between at least a plane, said plane being defined by the edge extracted from the image and the surveying instrument, and two fitted lines. Such a method is especially suitable for surveying wall structures such as houses or other kinds of buildings, having a corner directed towards the surveying instrument.

Thus, due to the extraction of the contour, by defining one or more planes an exact intersection point being the object representing point can be determined for all possible constellations of objects.

Furthermore, particularly, a base point given by a projection of the object representing point in a defined direction onto a ground surface, in particular vertically downwards, is derived by image processing, in particular by edge detection, or with a vertical distance being entered manually or being measured by an additional measurement on a perpendicular pole.

Further, image processing methods may be used to define an intersection of an extracted contour and the ground surface and thereof a vertical distance downwards from the object representing point may be calculated and so define the base point. In case of cylindrical, in particular circular, objects its radius can be determined, too.

Furthermore, particularly, the series of points can be projected onto a plane for determining whether the points are located on a plane object or on a cylindrical object to determine the shape of the object to be surveyed. Moreover, object defining values, in particular the radius or the volume of an object, can be determined.

Furthermore, particularly, the surveying instrument can be a total station or a total station comprising a remote control with a display.

Furthermore, particularly, an operator of the surveying instrument may execute the inventive surveying method in a manual manner.

Furthermore, particularly, the measured points coordinate data can refer to a local coordinate system defined by the surveying instrument.

Furthermore, particularly, the angle area can be a horizontal angle area, or the angle area can be a vertical angle area. Thus, even the determination of horizontal contours such as the height of a wall or of a building can be determined by the method according to the invention.

BRIEF DESCRIPTION OF THE DRAWINGS

Further advantages, objects and features of the invention will be appreciated from the detailed description of presently preferred embodiments considered together with the enclosed drawings, in which FIGS. 1a to 1d show a prior art surveying method, FIG. 2a shows another prior art surveying method, FIG. 3a shows a method according to the invention to survey a corner of a building located in front of a wall, FIG. 3b shows a method according to the invention to survey a corner of a building directed towards the surveying instrument, FIG. 3c shows a method according to the invention to survey a mast having a round section, FIG. 3d shows a method according to the invention to survey a mast having a square section.

DETAILED DESCRIPTION

Figure 5:
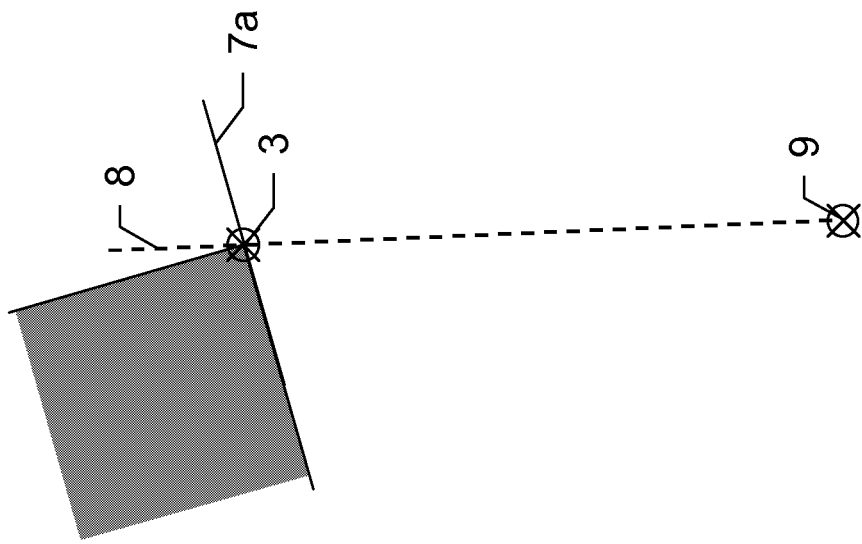
FIG. 5 shows a method according to the invention to determine a base point of an object to be surveyed.

Preferred embodiments of the invention will be described with reference to FIGS. 3 to 5.

FIG. 3a shows the surveying of a corner formed by wall elements 11 and 13. A series of laser beams is emitted from a total station 1 while the total station 1 rotates driven by a motor about its vertical axis in an angle area of ±2°. The laser beam impacts on the wall element 11 and produces a first series of points 6a.

In the figure, the series of points 6a consists of several individual points, the latter of which is referred to by the point mark 6a3. The laser beam is reflected from the wall element 11 back to the total station 1 and a horizontal and vertical angle, and the distance or derived coordinates of each point of the series of points 6a is stored.

Since the wall element 13 forming the corner together with the wall element 11 is out of sight when viewed from the total station 1, no reflection of the laser beam is capable from the wall element 13.

However, the laser beam subsequent to the one forming point 6a3 passes beyond the wall element 11 and impacts on a wall element 15 placed quite a distance behind the corner to be surveyed. The respective laser beam forms a point 6b1 being the first point of a second series of points 6b which is formed by reflection of the laser beam emitted from the total station 1 until the angle area is completed.

As with the first series of points 6a, a horizontal and vertical angle, and the distance or derived coordinates of each of the points of the second series of points 6b formed on the wall element 15 are stored. The stored data of the points refer to a coordinate system. The coordinate system is a local and fixed coordinate system. The origin point is a reference point of the total station 1 (the intersection point of the standing axis and a tilting axis of the total station 1), while a z-axis is parallel to the standing axis and a y-axis is directed into the direction of "0" of the horizontal angle circle.

After completion of the measuring process, on the basis of the obtained data the points are separated into a first group of points laying on the wall 11 and second group of points 6b laying in the background. In this case the distance between point 6a3 and 6b1 is significantly larger than the distances between all the other successive points. The points of the second group 6b are identified to lay in the background and are not considered in the further processing. This separation can be performed with an analysis of the spatial distribution of the points, particularly given by the distances from the surveying instrument to the successive points. Alternatively, the analysis of the spatial distribution in order to separate the points may be performed using further image information, in particular using image processing for defining a set of points on the one side of an extracted edge in the image and another set on the other side. Furthermore, the separation may be performed on the basis of colour information of an image. There may be points laying on a yellow coloured house wall and some more points laying next to the wall on a green forest background. By analysing the background colours of the points the separation of the points into the first group of points laying on the yellow wall and into the second group of points not laying on the wall but on a green background can be performed successfully. Using one or both of these image separation procedures in addition to the analysis of the spatial distribution the robustness of the separation may be increased and the correctness of the spatial distribution can be verified or rejected.

In the next step, a fitted line may be determined which represents the distribution of the first group of points $6a$, e.g. by the application of the "Ransac" algorithm. The first mathematical model for the fitted line which is investigated is for instance the straight line in 3D space. Since in this case the points of the first group $6a$ actually lay on a straight line, the model is accepted. Accordingly, the controller will determine the surveyed object to be a wall having a corner and the object representing point is a point along the corner edge.

Based on the data from the first series of points $6a$, a fitted line in the 3D space is calculated which is as far as possible approximated to the series of points $6a$.

Additionally, by using an incorporated camera, the total station 1 takes an image of the wall element 11 and of the corner to be surveyed, respectively, and the processor determines a contour representing the corner to be surveyed by using image processing software. The edge is then extracted. For improved edge detection the knowledge that the contour line in the image must lie between the points $6a3$ and $6b1$ is used for the definition of the region of interest. Consequently, the position of the line in the image can be restricted to a small region. When knowing the type of the object, e.g. a mast, the amount of contour lines that have to be detected are known as well. On the basis of the measured points the approximate position of these lines can be derived which improves the robustness of the edge detection.

The space curve is determined based on information of the first group of points and the extracted edge. The determination of such curve may be performed by considering points and contours only (without further fittings) and, thus, a curve which is defined by the spatial relation between the points and a relative position of the contours to the points may be derived. Thus, the space curve may not be an infinite curve but—as considering edges of objects—may provide at least a first end corresponding with e.g. a centre of an object or an edge of a building. In particular the space curve may be determined by an intersection of the fitted line to measured points with a plane derived on basis of the contours of the object.

Figure 4B:
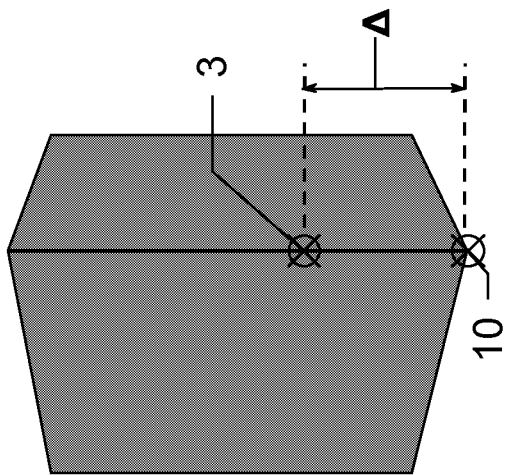
FIG. 4b shows a method according to the invention to determine an object representing point at a mast having a round shape.
Figure 4A:
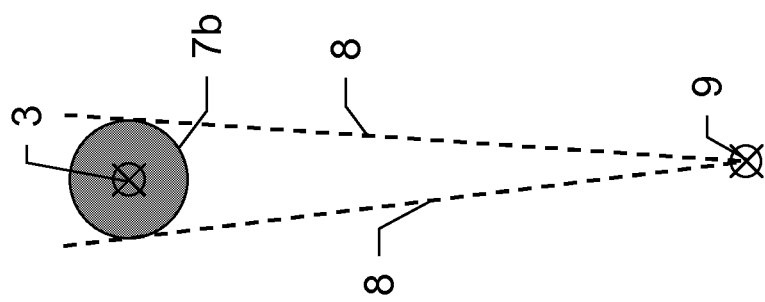
FIG. 4a shows a method according to the invention to determine an object representing point at a corner.
Figure 6:
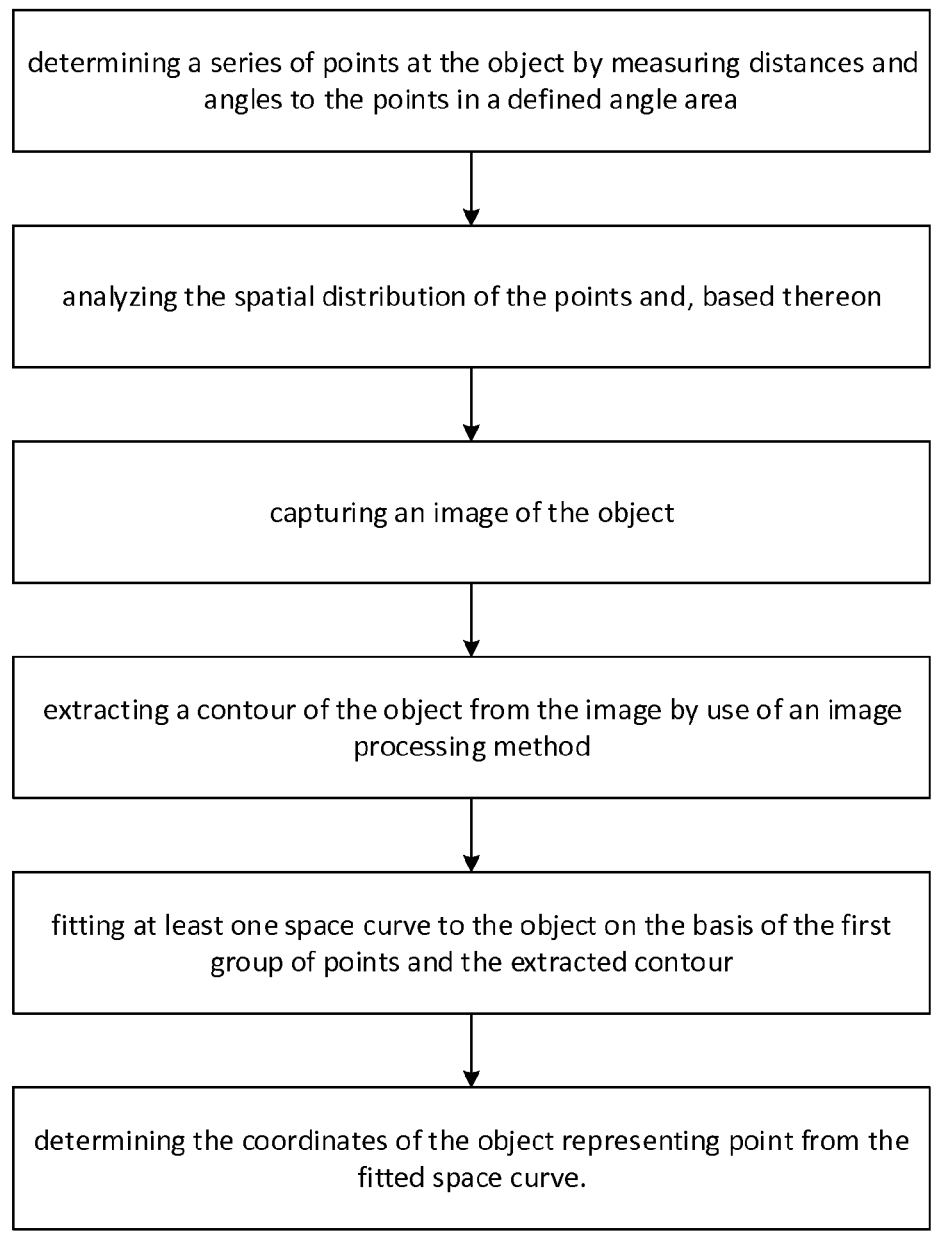
FIG. 6 shows a flowchart of a method for measuring an object.

As can be seen from FIG. 4$a$, as next step, a plane 8 is calculated by the processor, which is determined by the extracted edge of the corner to be surveyed and by the projection centre 9 of the camera. Thereafter, the line 7$a$ is intersected with the plane 8 and, thus, an object representing point 3 exactly corresponding to the edge to be surveyed is determined.

Furthermore, a base point 10 of the corner to be surveyed, given by a projection of the object representing point in a defined direction onto a ground surface, in particular vertically downwards, can then be calculated as shown in FIG. 5 by subtracting the vertical height A of the computed point 3 from its vertical coordinate data. The vertical height A can be either manually entered by the user, or can be determined from the image via image processing, or can be obtained by an additional measuring step onto the perpendicular pole which is held in the height A of the point 3.

Another embodiment suitable for surveying a corner directed towards the total station 1 will be described on the basis of FIG. 3$b$. As in the embodiment of FIG. 3$a$, a first series of points $6c$ is formed on a first wall element 17 forming the corner to be surveyed together with a second wall element 19. A second series of points $6d$ is formed on the second wall element 19.

The points may be stored with associated distances and angles in a table or a database. After the data of the points have been stored, the controlling unit analyses the distances between successive points in order to determine the group of points laying on the object (first group) and the complementary set of points in the background (second group). Since no significantly large distance difference is detected all the points are assigned to the group of points lying on the object and no points are assigned to the group of background points.

In the next step, the fitted line or—if there are more than one like in this case—the fitted line are determined which best fit the group of points using for instance the "Ransac" or the "Split-and-Merge" algorithm.

In the "Ransac" algorithm a mathematical model for instance a straight line is assigned to the first group of points. The algorithm will start with two random points of the whole set, for instance two points laying in the wall 17, and compute the straight line through the two points. Then, all the other points are tested against the fitted straight line. The algorithm will identify a subset of points $6c$ as 'inners' and the points laying in the wall 19 as "outliers". The same procedure is repeated, but instead of the whole set, only the set of "outliers" is used. The algorithm will identify that the "outliers" from the first test form a second straight line and assign the corresponding points to another subset $6d$.

In contrast to surveying method of FIG. 3$a$, here two subsets of points $6c$ and $6d$ are used for calculating two respective lines in the 3D space. Thereafter, the processing is performed as already described with respect to the surveying of the edge shown in FIG. 3$a$. That is, after extracting the edge in the image corresponding to the corner to be surveyed, a plane is formed which is intersected with the two lines to determine the object representing point corresponding to the corner of the wall elements 17 and 19. Thereafter, the respective base point can be determined as mentioned above.

A further embodiment suitable for surveying a cylindrical object such as a mast, an advertising pillar or a tree is especially described on the basis of FIGS. 3$c$ and 4$b$. It will be assumed that the cylindrical object is a mast 21. However, the method according to the embodiment is applicable for any cylindrical or round shaped object. As can be seen in FIG. 3$c$, two series of points $6f$ and $6g$ are formed on a wall 27 located behind the mast 21 and one series of points $6e$ is formed on the mast 21, respectively. As mentioned with respect to the embodiment of FIG. 3$a$, since the distance between the respective adjacent points of the series $6f$ and $6e$ and the series $6e$ and $6g$, respectively, exceeds a predetermined distance, the group of points $6f$ and $6g$ are identified to lay in the background and will not be further treated.

The points $6e$ formed on the surface of the mast 21, however, are used as basis for the ongoing calculation. For the determination of the fitted line again the "Ransac" algorithm can be applied. In a first step the points are tested against a straight line. Since the mast 21 has a circular cylindrical shape and accordingly the points $6e$ cannot be approximated to a straight line, the model will not be accepted. In a second step an ellipse is used as mathematical model. In this case the algorithm selects four random points from the group of points $6e$, fits an ellipse into these four points, and tests all remaining points against the fitted ellipse. Since all of the points $6e$ actually lay more or less on an ellipse, the model will be accepted.

Thereafter, the contours of the mast 21 are detected on an image by image processing. A left and a right edge are extracted from the image by edge detection, and on the basis of the extracted edge and the projection centre 9 of the total station 1, two respective planes 8 are calculated.

Since the mast 21 has a cylindrical shape and accordingly the points 6e cannot be approximated to a straight line, the ellipse 7b is instead calculated, which on the one hand is approximated to the series of points 6e as far as possible and on the other hand is fit between the two planes 8 in a manner touching both planes 8 (space curve). Then, a centre point of the ellipse 7b is determined as the object representing point 3. Additional object defining values, in particular the radius of the mast, can be determined from the centre point and the planes as well. A base point 10 can then be determined as described with respect to the embodiment of FIG. 3a.

FIG. 3d shows the surveying process of a mast having a squared section according to another embodiment. As can be seen from the figure, the principles already applied in the embodiments of FIGS. 3a and 3b are combined. That is, two series of points 6h and 6i are formed on wall faces 23 and 25, respectively, while two more series of points 6j and 6k are formed on a wall located behind the mast.

As mentioned above, the series of points 6j and 6k will be excluded from the further calculation, because the distance to the points respectively adjacent to the respective outermost points of the series of points 6h and 6i exceeds a predetermined distance. With the two remaining series of points 6h and 6i an analogous processing to that of the corner in FIG. 3b is performed.

Furthermore, instead of the total station 1 described above, the invention can be employed with a total station 1 comprising a remote control having a display. Thus, via the remote control, a user can control onto which object point the total station 1 is aimed, as well as start the program for performing the surveying method described above.

Thus, according to the invention, a reliable method for accurately determining object representing points as well as base points for various kinds of objects to be surveyed has been disclosed. However, it is to be understood that, while the invention has been described with reference to its presently preferred embodiments, the scope of the invention is merely defined by the attached claims.

What is claimed is:

1. A surveying method for measuring an object, wherein the object belongs to a group of known types of objects, and determining an object representing point corresponding to the type of the object, by a surveying instrument configured to measure distances and angles, and comprising a processor and a camera, the method comprising:
   determining with the processor a series of points at the object by measuring distances and angles to the points in a defined angle area;
   analyzing with the processor the spatial distribution of the points and, based thereon, identifying the type of the object and assigning relevant points lying on the object to a first group of points;
   capturing an image of the object with the camera;
   extracting a contour of the object from the image with the processor by use of an image processing method;
   fitting with the processor at least one space curve to the object on the basis of the first group of points and the extracted contour; and
   determining with the processor the coordinates of the object representing point from the fitted space curve,
   wherein the series of points is split into at least a first group of relevant points presumably laying on the object and a second group of points by distances analysis and/or software algorithms executed by the processor, and at least one fitted line is calculated, which corresponds to the first group of points.

2. A surveying method according to claim 1, furthermore comprising the steps of:
   aiming the surveying instrument at the object; and
   automatically executing the surveying method.

3. A surveying method according to claim 1, wherein the series of points is split into at least a first group of relevant points presumably laying on the object and a second group of points laying in the background, by distances analysis and/or software algorithms with a Split-and-Marge and/or a Ransac method, and at least one fitted line is calculated, which corresponds to the first group of points.

4. A surveying method according to claim 1, wherein the series of points is split into at least a first group of relevant points and a second group of relevant points by distances analysis and/or software algorithms, in particular with a Split-and-Marge and/or a Ransac method, and at least two fitted line are calculated, the one fitted line corresponding to the first group of points and the second fitted line corresponding to the second group of points.

5. A surveying method according to claim 1, wherein a plane is defined by the extracted contour and a point at the surveying instrument, and an object representing point is determined as an intersection point between the plane and the fitted line.

6. A surveying method according to claim 1, wherein two planes are defined by the one point at the surveying instrument and the extracted contour.

7. A surveying method according to claim 1, wherein two planes are defined by the one point at the surveying instrument and the extracted contour, wherein the object is a mast and the contour comprises two straight lines, and an object representing point is determined corresponding to the space curve between the two planes.

8. A surveying method according to claim 1, wherein an object representing point is determined as an intersection point between at least one plane, said plane being defined by the extracted contour and the surveying instrument, and two fitted lines.

9. A surveying method according to claim 1, wherein a base point, given by a projection of the object representing point in a defined direction onto a ground surface is derived by image processing or is determined by using a vertical distance A, said vertical distance A being entered manually or being derived from an additional measurement on a perpendicular pole.

10. A surveying method according to claim 1, wherein a base point, given by a projection of the object representing point in a defined direction onto a ground surface vertically downwards is derived by edge detection or is determined by using a vertical distance A, said vertical distance A being entered manually or being derived from an additional measurement on a perpendicular pole.

11. A surveying method according to claim 1, wherein the series of points is projected onto a plane to determine whether the points are located on a plane object or on a cylindrical object or are not located on an object.

12. A surveying method according to claim 1, wherein object defining values are determined, in particular a radius of a cylindrical object is calculated.

13. A surveying method according to claim 12, wherein a radius of a cylindrical object is calculated with the processor.

14. A surveying method according to claim 1, wherein the surveying instrument is a total station or a total station comprising a remote control with a display.

15. A surveying method according to claim 1, wherein the coordinate data of the object representing point refer to a local coordinate system defined by the surveying instrument.

16. A surveying method according to claim 1, wherein the series of points comprises between 5 to 100 points.

17. A surveying instrument comprising a distance measuring unit, an angle determination unit, a camera and the processor for executing the surveying method corresponding to claim 1, wherein the surveying method is automatically executed.

18. A total station comprising a distance measuring unit, an angle determination unit, a camera and the processor for executing the surveying method corresponding to claim 1, wherein the surveying method is automatically executed.

* * * * *